United States Patent [19]

Allen

[11] Patent Number: 4,804,700
[45] Date of Patent: Feb. 14, 1989

[54] RESINOUS COMPOSITIONS

[75] Inventor: Deborah L. Allen, Pittsfield, Mass.

[73] Assignee: General Electric Company, Mt. Vernon, Ind.

[21] Appl. No.: 756,281

[22] Filed: Jul. 11, 1985

[51] Int. Cl.[4] .................... C08L 67/02; C08L 71/04
[52] U.S. Cl. .................... 524/166; 524/161; 525/394; 525/439
[58] Field of Search ............ 525/394, 439; 524/166, 524/161

[56] References Cited

U.S. PATENT DOCUMENTS

| | | | |
|---|---|---|---|
| 3,221,080 | 11/1965 | Fox | 525/439 |
| 3,819,759 | 6/1974 | Weaver | 525/439 |
| 4,048,133 | 9/1977 | Adelmann | 525/394 |
| 4,238,597 | 12/1980 | Markezich | 528/179 |
| 4,260,731 | 4/1981 | Mori | 528/173 |
| 4,286,075 | 8/1981 | Robeson | 525/68 |
| 4,355,150 | 10/1982 | Bosnyak | 528/176 |
| 4,369,136 | 1/1983 | Robeson | 524/371 |
| 4,369,303 | 11/1983 | Mori | 528/173 |
| 4,485,219 | 11/1984 | Falk | 525/394 |
| 4,571,419 | 2/1986 | Maresca | 525/439 |

*Primary Examiner*—Patricia Short
*Attorney, Agent, or Firm*—Martin B. Barancik; Myron B. Kapustij

[57] ABSTRACT

Resinous composition comprised of, in physical admixture: (i) at least one copolyester-carbonate resin, (ii) at least one polyarylate resin, and (iii) at least one resin selected from polyphenylene ether resins, polystyrene resins, and mixtures thereof.

14 Claims, No Drawings

RESINOUS COMPOSITIONS

BACKGROUND OF THE INVENTION

Certain polymers such as polyarylates are known to posses certain advantageous properties such as, for example, excellent thermal stability. However, polyarylates are generally difficult to process and do not exhibit the requisite degree of impact strength and tensile modulus needed for certain applications. Copolyester-carbonate resins exhibit good thermal and impact properties. However, these resins are also somewhat difficult to process. Resins such as polyphenylene ethers exhibit good processability and good tensile modulus, while other resins such as polystyrenes exhibit excellent processability.

Thus a multicomponent blend can be hypothesized on the basis of blending resins possessing certain strong properties with resins exhibiting weaknesses in those same properties. However, certain practical considerations inhibit implementation of this theory. For example, all resins are not compatible with each other. Furthermore, certain resins cannot be blended together because they may adversely affect the properties of the blend, i.e., they tend to degrade each others advantageous properties.

It is an object of the instant invention to provide blends exhibiting good compatability of the various resinous components and wherein the weakness in certain properties of certain resins are offset or compensated for by the strengths of other resins in these same properties.

SUMMARY OF THE INVENTION

In accordance with the instant invention there is provided a novel composition comprised of, in physical admixture, (i) at least one copolyester-carbonate resin, (ii) at least one polyarylate resin, and (iii) at least one resin selected from polystyrene resins, polyphenylene ether resins, and mixtures thereof. These blends exhibit good compatibility of the components and can be molded into a variety of articles.

DESCRIPTION OF THE INVENTION

In accordance with the instant invention there is provided a novel blend exhibiting good compatability of its component parts comprised of, in physical admixture, (i) at least one copolyester-carbonate resin, (ii) at least one polyarylate resin, and (iii) at least one resin selected from polystyrene resins, polyphenylene oxide resins, and mixtures thereof.

Briefly stated, the copolyester-carbonate resins of this invention comprise recurring carbonate groups, carboxylate groups, and aromatic carbocyclic groups in the linear polymer chain, in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain, wherein the amount of the ester bonds is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonates may be prepared by several known methods. These methods include the interfacial polymerization process, transesterification, melt polymerization, and the like. These copolyester-carbonates, and the methods for their preparation, are disclosed, inter alia, in U.S. Pat. Nos. 3,169,121, 4,156,069, 4,238,596 and 4,238,597, all of which are hereby incorporated herein by reference.

The copolyester-carbonates may be conveniently prepared by the reaction of (a) at least one dihydric phenol, (b) a carbonate precursor, and (c) at least one ester precursor.

The dihydric phenols useful in the preparation of the copolyester-carbonates are known dihydric phenols and may be represented by the general formula

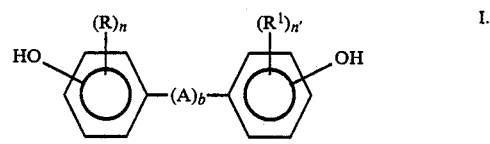

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals;
A is selcted from divalent hydrocarbon radicals,

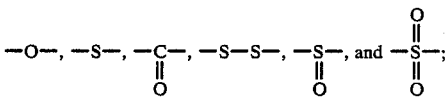

n and n' are independently selected from positive integers having a value of from 0 to 4 inclusive; and
b is either zero or one.

The monovalent hydrocarbon radicals represented by R and $R^1$ include the alkyl, cycloalkyl, aryl, aralkyl, and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 20 carbon atoms.

The preferred halogen radicals represented by R and $R^1$ are chlorine and bromine.

The monovalent hydrocarbonoxy radicals represented by R and $R^1$ are those represented by the general formula $-OR^2$, wherein $R^2$ is a monovalent hydrocarbon radical as defined for R and $R^1$.

The divalent hydrocarbon radicals represented by A include the arylene, alkylene, alkylidene, cycloalkylene and cycloalkylidene radicals. The preferred arylene radicals are those containing from 6 to 12 ring carbon atoms, i.e., phenylene, naphthylene, and biphenylene. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from about 6 to about 16 ring carbon atoms.

In the dihydric phenol compounds represented by Formula I R and $R^1$ may be the same or they may be different. When more than one R substituent is present they may be the same or different. Likewise, when more than one $R^1$ susbtituent is present they may be the same or different. Where b is zero in Formula I the aromatic rings are directly joined with no intevening alkylene or other bridging group. The positions of the hydroxyl groups and R and $R^1$ on the aromatic nuclear residues can be varied in the ortho, meta or para poitions and the groups can be in a vicinal, asymmetrical or symmetrical relationship where two or more aromatic ring carbon atoms are substituted with R or $R^1$ and hydroxyl.

Some illustrative non-limiting examples of the dihydric phenols of Formula I include: 2,2-bis(4-hydroxyphenyl)propane (bisphenol-A); 2,2-bis(3,5-dimethyl-4-hydroxyphenyl)propane; 2,2-bis(3,5-dibromo-4-hydroxyphenyl)propane; 1,1-bis(3,5-dimethyl-4-hydroxyphenyl)cyclohexane;
1,1-bis(4-hydroxyphenyl)cyclohexane;
1,1-bis(4-hydroxyphenyl)octane;
1,5-bis(4-hydroxyphenyl)pentane;
bis(4-hydroxyphenyl)ether;
4,4'-thiodiphenol;
p,p'-dihydroxydiphenyl;
bis(3-ethyl-4-hydroxyphenyl)ether;
bis(3,5-dibromo-4hydroxyphenyl)sulfoxide; and
bis(4-hydroxyphenyl)sulfoxide.

A variety of additional dihydric phenols are also available and are described, inter alia, in U.S. Pat. Nos. 2,999,835, 3,028,365 and 3,153,008, all of which are incorporated herein by reference.

It is, of course, possible to use mixtures of two or more different dihydric phenols as well as individual dihydric phenols in the preparation of the instant copolyester-carbonates.

The carbonate precursor may be a carbonyl halide, a bishaloformate, or a diarylcarbonate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, hydroquinone, and the like; or the bishaloformates of glycols such as the bishaloformates of ethylene glycol, neopentyl glycol, polyethylene glycol, and the like. Typical of the diarylcarbonates which may be employed are diphenyl carbonate and the di(alkylphenyl)carbonates such as di(tolyl)carbonate. Some other non-limiting examples of suitable diarylcarbonates include di(naphthyl)carbonate, phenyl tolyl carbonate, and the like. The preferred carbonate precursors are the carbonyl halides with carbonyl chloride, also known as phosgene, being the preferred carbonyl halide.

The ester precursor may be a difunctional carboxylic acid or an ester forming reactive derivative thereof. The difnctional carboxylic acids which are useful as the ester precursors include any difunctional carboxylic acid conventionally used in the preparation of linear polyesters. Generally, the difunctional carboxylic acids which may be used include the aliphatic carboxylic acids, the aiphatic aromatic carboxylic acids, and the aromatic carboxylic acids. These acids are described in U.S. Pat. No. 3,169,121, which is incorporated herein by reference.

The preferred difunctional carboxylic acids are the aromatic carboxylic acids. Particularly useful aromatic carboxylic acids may be represented by the general formula

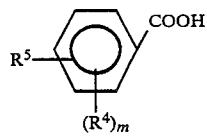

wherein:
$R^5$ is either a hydroxyl or carboxyl group;
$R^4$ is independently selected from alkyl radicals, preferably those containing from 1 to about 8 carbon atoms, and halogen radicals; and
m is a positive integer having a value of from 0 to 4 inclusive.

Particularly useful difunctional aromatic carboxylic acids of Formula II are the aromatic dicarboxylic acids, i.e., those acids of Formula II wherein $R^5$ is a carboxyl groups.

Some particularly useful aromatic dicarboxylic acids are isophthalic acid, terephthlaic acid, and mixtures thereof.

The preferred ester precursors are the ester forming reactive derivatives of the difunctional carboxylic acids, with the ester forming reactive derivatives of the difunctional aromatic carboxylic acids being preferred. Particularly useful ester forming reactive derivatives of the difunctional carboxylic acids are the acid dihalides. Some illustrative non-limiting examples of these acid halides include isophthaloyl dichloride, terephthaloyl dichloride, and mixtures thereof.

The copolyester-carbonates of the present invention may be conveniently prepared by the interfacial polymerization process utilizing the dihydric phenols of Formula I, the ester precursors, the carbonate precursor, a water immiscible organic solvent such as methylene chloride, an aqueous caustic solution, a molecular weight regulator, and a catalyst.

The molecular weight regulators include any of the known materials that control the molecular weight of the copolyester-carbonate by a chain terminating mechanism. These compounds include, but are not limited to, phenol, tertiarybutyl phenol, and chroman-I.

The catalysts which can be employed in the interfacial polymerization process are any of the known catalysts which catalyze the copolyester-carbonate forming reaction. These catalysts include, but are not limited to, tertiary amines such as triethylamine, tributylamine, and the like; quaternary ammonium compounds; and quaternary phosphonium compounds.

Also included herein are the randomly branched thermoplastic copolyester-carbonates formed by the reaction of the dihydric phenol, carbonate precursor, ester precursor, and a minor amount of a branching agent. Typically the branching agent is used in from about 0.05 to about 2 mole percent, based on the amount of dihydric phenol employed. These branching agents are well known in the art and are generally polyfunctional aromatic compounds containing at least three functional groups such as hydroxyl, carboxyl, haloformyl, anhydride, and mixtures thereof. Some illustrative non-limiting examples of these branching agents include trimellitic anhydride, trimellitic acid, trimellityl trichloride, 4-chloroformyl phthalic anhydride, pyromellitic acid, pyromellitic dianhydride, trimesic acid, and the like. Other organic polyfunctional compounds useful in making these randomly branched thermoplastic copolyester-carbonates are disclosed, inter alia, in U.S.

Pat. Nos. 3,635,895 and 4,001,184, both of which are incorporated herein by reference.

The high molecular weight thermoplastic aromatic copolyester-carbonates of the instant invention generally have a weight average molecular weight in the range of from about 10,000 to about 200,000, preferably from about 20,000 to about 150,000.

The polyarylates employed in the instant invention are known compounds and are described, along with methods for their prepartion, in U.S. Pat. Nos. 3,216,970, 3,234,167, 3,388,097, 3,824,213, 3,884,990 and 3,946,091, all of which are incorporated herein by reference. The polyarylates are polymers consisting essentially of aromatic ester units and may be conveniently prepared by the reaction of at least one dihydric phenol and at least one aromatic dicarboxylic acid or an ester forming reactive derivative thereof.

The dihydric phenols useful in the preparation of the polyarylates are those as described hereinafore. The aromatic dicarboxylic acids used in the preparation of the polyarylates may be represented by the general formula

   III.

wherein Ar represents a divalent aromatic radical, preferably one containing from 6 to about 20 carbon atoms. Some illustrative non-limiting examples of these divalent aromatic radicals include phenylene, substituted, preferably alkyl substituted, phenylene, biphenylene, substituted, preferably alkyl substituted, biphenylene, naphthylene, and substituted, preferably alkyl substituted, naphthylene. In Formula III Ar may also represent a divalent radical of the type $Ar'-R^6-AR''$ wherein $Ar'$ and $Ar''$ are independently selected from the type of aromatic radicals described for Ar, and $R^6$ has the same meaning as A in Formula I.

Particularly useful aromatic dicarboxylic acids of Formula III are those represented by the general formula

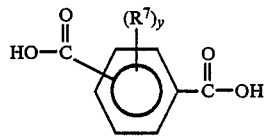   IV.

wherein $R^7$ is independently selected from alkyl radicals containing from 1 to about 8 carbon atoms and y is a positive integer having a value of from 0 to 4 inclusive.

Particularly useful aromatic dicarboxylic acids of Formula IV are isophthalic acid, terephthalic acid, and mixtures thereof.

Instead of using the aromatic dicarboxylic acids per se it is preferred to utilize their ester forming reactive derivatives. Particularly useful ester forming reactive derivatives of the aromatic dicarboxylic acids are the acid dihalides, with the acid dichlorides being the preferred acid dihalides. Thus, for example, instead of using isophthalic acid, terephthalic acid, and mixtures thereof it is preferred to employ isophthaloyl dichloride, terephthaloyl dichloride, and mixtures thereof.

The polyarylates may be prepared by a variety of known processes such as interfacial polymerization, melt polymerization, transesterification, and the like.

The polyarylates may be conveniently prepared by the interfacial polymerization process utilizing, as the reactants, at least one dihydric phenol and at least one aromatic dicarboxylic acid or, preferably, its ester forming reactive derivative, and also employing a water immiscible organic solvent such as methylene chloride, an aqueous caustic solution, a catalyst of the type described hereinafore, and a molecular weight regulator of the type described hereinafore.

The styrene resins used in the instant compositions or blends are well kown and are generally commercially available or may be readily prepared by known conventional methods. These styrene resins are described, inter alia, in U.S. Pat. No. 3,383,435; Billmeyer, Fred W. Jr., Textbook of Polymer Science, Interscience Publishers, New York, 1966, pages 383-386 and 394–400; and Teach, W.C. and Kiessling, G.C., *Polystyrene*, Reinhold Publishing Corp., New York, 1960, all of which are hereby incorporated herein by reference.

The term "styrene resin" as used herein includes the homopolymers such as polystyrene and polychlorostyrene, the modified polystyrenes such as rubber modified polystyrenes, and the styrene containing copolymers such as the styrene-acrylonitrile copolymers, styrene-butadiene copolymers, styrene-acrylonitrile-alpha-alkyl styrene copolymers, acrylonitrile-butadiene-styrene copolymers, poly-alpha-methylstyrene, styrene-coumarine-indine copolymers, copolymers of ethylvinylbenzene and divinylbenzene, high impact polystyrenes, and the like.

Preferred styrene resins used in the instant invention are preferably those having at least about 25 weight percent polymer units derived from compounds having the general formula

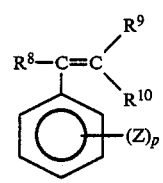   V.

wherein $R^8$, $R^9$ and $R^{10}$ are independently selected from hydrogen, lower alkyl radicals, preferably those containing from 1 to about 5 carbon atoms, and halogen radicals, preferably chlorine or bromine; Z is independently selected from vinyl, halogen, preferably chlorine or bromine, and lower alkyl radicals, preferably those containing from 1 to about 5 carbon atoms, and p is 0 to 5 inclusive.

Particularly useful styrene containing copolymers are the acrylonitrile-butadiene-styrene resins (ABS resins), the molecules of which contain two or more polymeric parts of different compositions that are bonded chemically. The polymer is preferably prepared by polymerizing a conjugated diene, such as butadiene or a conjugated diene with a monomer copolymerizable therewith such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene such as polybutadiene, polyisoprene, or a copolymer such as butadiene-styrene, butadiene-acrylonitrile, or the like.

The specific conjugated diene monomers normally utilized in preparing the backbone of the graft polymer are generically described by the following formula:

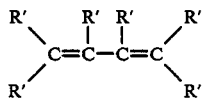

wherein R' is independently selected from hydrogen, lower alkyl groups, preferably those containing from 1 to about 5 carbon atoms, and halogens, preferably preferably bromine or chlorine. Examples of dienes that may be used include butadiene, isoprene, 1,3-heptadiene, methyl-1,3-pentadiene, 2,3-dimethyl-1,3-butadiene, 2-ethyl-1,3-pentadiene, 1,3- and 2,4-hexadiene, chloro and bromo substituted butadienes such as dichlorobutadiene, bromobutadiene, dibromobutadiene, and mixtures thereof, and the like. A preferred conjugated diene is butadiene.

One monomer or group of monomers that may be polymerized in the presence of the prepolymerized backbone are monovinylaromatic hydrocarbons. The monovinyl aromatic monomers utilized are generically described by formula V with the exception that Z is independently selected from lower alkyl radicals and halogen radicals. Examples of the monovinylaromatic compounds include styrene, 3-methylstyrene, 3,5-diethylstyrene, 4-n-propylstyrene, alpha-methylstyrene, alpha-methyl-toluene, alpha-chlorostyrene, alpha-bromostyrene, mixtures thereof, and the like. The preferred monovinylaromatic compounds are styrene and alpha-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates or acrylates such as methyl methacrylate.

The acrylonitrile, substituted acrylonitrile, or acrylic acid esters are described generically by the following formula:

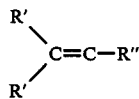

wherein R' is as previously defined and R" is selected from cyano and carbalkoxy wherein the alkoxy group of the carbalkoxy contains from 1 to about 12 carbon atoms. Examples of such monomers include acrylonitrile, ethacrylonitrile, methacrylonitrile, alphachloroacrylonitrile, beta-chloroacrylonitrile, alphabromoacrylonitrile and beta-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the prferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95 percent by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic compound exemplified by styrene comprises from about 30 to about 70 weight percent of the total graft polymer composition.

In preparing the polymer it is normal to have a certain percentage of the polymerizing monomers that are grafted on the backbone combine with each other and occur as free copolymer. If styrene is utilized as one of the grafting monomers and acrylonitrile as the second grafting monomer a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methylstyrene-acrylonitrile copolymer. Also, there are occasions where a copolymer, such as alpha-methylstyrene-acrylonitrile, is added to the graft polymer copolymer blend. When the graft polymer-copolymer blend is referred to herein, it is meant optionally to include at least one copolymer blended with the graft polymer composition and which may contain up to about 90% of free copolymer.

Optionally the elastomeric backbone may be an acrylate rubber, such as one based on n-butyl acrylate, ethyl acrylate, 2-ethylhexyl acrylate, and the like. Additionally minor amounts of a diene may be copolymerized in the acrylate rubber backbone to yield improved grafting with the matrix polymer.

These ABS type resins are also well known in the art and are generally commercially available.

The polyphenylene ethers are known polymers which are described, inter alia, in U.S. Pat. Nos. 3,306,874, 3,306,875, 3,257,357, and 3,257,348, all of which are incorporated herein by reference. Particularly useful polyphenylene ethers, from the standpoint of the instant compositions, are those having the repeating structural unit of the formula

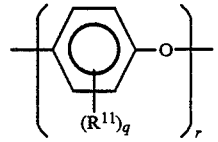

wherein $R^{11}$ is independently selected from monovalent substituents selected from halogen, hydrocarbon radicals free of tertiary alpha-carbon atoms, halohydrocarbon radicals having at least two carbon atoms between the halogen atom and the phenyl nucleus and being free of alpha-carbon atoms, hydrocarbonoxy radicals being free of a tertiary alpha-carbon atom, and halohydrocarbonoxy radicals having at least 2 carbon atoms between the halogen atom and the phenyl nucleus and being free of tertiary alphacarbon atom; q is a positive integer having a value of from 0 to 4 inclusive; and r is a positive integer of at least 50. Examples of suitable polymers may be found in the above referenced patents.

Particularly useful polyphenylene ethers of this type are those having alkyl substitution ortho to the oxygen ether atom and preferably ortho methyl substitution.

Particularly useful polyphenylene ethers are those containing recurring structural units represented by the general formula

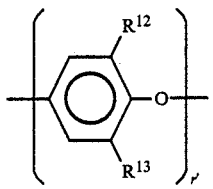

IX.

wherein $R^{12}$ and $R^{13}$ are independently selected from methyl and ethyl radicals and r' is a positive integer having a value of at least about 50.

Some illustrative non-limiting examples of polyphenylene ethers include poly(2,6-dimethyl-1,4-phenylene)ether, poly(2-methyl-6-ethyl-1,4-phenylene)ether, and poly(2,6-diethyl-1,4-phenylene) ether.

The instant blends contain (i) at least one copolyester-carbonate resin, (ii) at least one polyarylate resin, and (iii) (a) at least one polystyrene resin, or (b) at least one polyphenylene ether resin, or (c) a mixture of at least one polystyrene resin and at least one polyphenylene ether resin. The instant invention thus includes the following blends : BLEND A containing (i) at least one copolyester-carbonate resin, (ii) at least one polyarylate resin, and (iii) at least one polystyrene resin; BLEND B containing (i) at least one copolyester-carbonate resin, (ii) at least one polyarylate resin, and (iii) at least one polyphenylene ether resin; and BLEND C containing (i) at least one copolyester-carbonate resin, (ii) at least one polyarylate resin, (iii) at least one polystyrene resin, and (iv) at least one polyphenylene ether resin.

Generally, the blends of the instant invention contain from about 10 to about 80 weight percent of component (i), i.e., at least one copolyester-carbonate resin, from about 10 to about 80 weight percent of component (ii), i.e., at least one polyarylate resin, and from about 5 to about 70 weight percent of component (iii), i.e., at least one resin selected from polyphenylene ether resins, polystyrene resins, and mixtures thereof. Preferably the blends of the instant invention contain from about 15 to about 65 weight percent of component (i), from about 15 to about 65 weight percent of component (ii), and from about 10 to about 60 weight percent of component (iii). More preferably the instant blends contain from about 25 to about 40 weight percent of component (i), from about 25 to about 40 weight percent of component (ii), and from about 25 to about 40 weight percent of component (iii). If component (iii) is comprised of a mixture of polyphenylene ether resin and polystyrene resin this mixture generally contains from about 10 to about 90 weight percent of polyphenylene ether resin and from about 90 to about 10 weight percent of polystrrene resin, preferably from about 20 to about 80 weight percent of polyphenylene ether resin and from about 80 to about 20 weight percent of polystyrene resin, and more prefereably from about 35 to about 65 weight percent polyphenylene ether resin and from 65 to about 35 weight percent of polystyrene resin.

The compositions of this invention are prepared by any conventional mixing methods. For example, one method involves mixing the copolyester-carbonate resin, polyarylate resin, and polyphenylene ether resin or polystyrene resin or mixtures of polyphenylene ether resin and polystyrene resin in powder or granular form in an extruder and extruding the mixture into strands, chopping the strands into pellets and molding the pellets into the desired article.

The compositions of the instant invention may optionally contain the well known and commonly used additives. These additives include, but are not limited to, inert fillers such as mica, clay, talc, glass spheres or strands, and the like; impact modifiers; ultraviolet radiation absorbers such as the benzophenones, benzotriazoles, and cyanoacryaltes; antioxidants; mold release agents; colorants; hydrolytic stabilizers such as the epoxides disclosed in U.S. Pat. Nos. 3,489,716, 4,138,379 and 3,839,247, all of which are incorporated herein by reference; color stabilizers such as the organophosphites; and flame retardants.

Some particularly useful flame retardant additives are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,931,100, 3,978,025, 3,953,399, 3,917,599, 3,951,910 and 3,940,366, all of which are incorporated herein by reference.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percentages are parts and percentages by weight, unless otherwise specified.

EXAMPLE 1

This example illustrates the preparation of a three component blend containg 1 part by weight copolyester-carbonate resin, 1 part by weight of polyarylate resin, and 1 part by weight of polyphenylene ether resin. One part by weight of a solution containing 1 part by weight of copolyester-carbonate resin dissolved in 9 parts by weight of chloroform is mixed with one part by weight of a solution containing 1 part by weight of polyarylate resin dissolved in 9 parts by weight of chloroform and one part by weight of a solution containing 1 part by weight of polyphenylene ether resin dissolved in 9 parts by weight of chloroform. The copolyester-carbonate resin has an ester content of about 75 mole percent, said ester content being about 93 mole percent isophthalate and about 7 mole percent terephthalate. The polyphenylene ether resin is General Electric's NORYL ® resin. The polyarylate resin is Union Carbide's U-100 polyarylate resin. The chloroform solvent is evaporated from the solution mixture, thereby resulting in a solid three component blend.

The second order glass transition temperature (Tg) of the blend is determined using a Perkins-Elmer DSC-2B instrument which measures the second order glass transition temperature by differential scanning calorimetry. The blend is found to have Tgs of 188° C. and 213° C.

EXAMPLE 2

This examples illustrates the preparation of a four component blend containing 1 part by weight of copolyester-carbonate resin, 1 part by weight of polyarylate resin, 0.5 part by weight of polyphenylene ether resin, and 0.5 part by weight of high impact polystyrene resin.

There are thoroughly mixed together one part by weight of a solution containing 1 part by weight of the copolyester-carbonate resin of Example 1 dissolved in 9 parts by weight of chloroform, one part by weight of a solution containing 1 part by weight of the polyarylate resin of Example 1 dissolved in 9 parts by weight of chloroform, 0.5 part by weight of a solution containing 1 part by weight of the polyphenylene ether resin of Example 1 dissolved in 9 parts by weight of chloroform, and 0.5 part by weight of a solution containing 1 part by weight of high impact polystyrene resin ( U.S. Steel's high impact polystyrene 43-80). The chloroform solvent is evaporated from the resultant solution mixture, thereby forming a solid four component blend.

The Tg of this blend is determined in accordance with the procedure of Example 1 and is found to be 137° C. and 186° C.

EXAMPLE 3

A four component blend of the type described in Example 2 is prepared substantially in accordance with the procedure of Example 2, except that the polystyrene resin is Arco's DYLENE 8G high molecular weight polystyrene.

The Tg of this blend is found to be 141° C. and 189° C.

EXAMPLE 4

This example illustrates the preparation of a three component blend containing 1 part by weight of copolyester-carbonate resin, 1 part by weight of polyarylate resin, and 1 part by weight of polystyrene resin.

There are thoroughly mixed together one part by weight of the copolyester-carbonate resin soltuion of Example 2, one part by weight of the polyarylate solution of Example 2, and one part by weight of the polystyrene solution of Example 3.

The Tg of the three component blend is determined in accordance with the procedure of Example 1 and is found to be 102° C. and 183° C.

By selection of the amounts and types of the individual resinous components blends may be provided which exhibit a range of properties which are suitable for various specific applications. Thus, in effect, the blends of the instant invention can be taylor made to meet the specific requirements necessary for specific applications. For example, if a particular application requires quite good thermal properties, good imapct properties, and good flexural modulus, blends containing equal amounts of copolyester-carbonate resin, polyarylate resin, and polyphenylene ether resin may be used. If the application requires good processability then the blends containing copolyester-carbonate resin, polyarylate resin, and polystyrene resin may be employed.

The instant blends are predicated upon the discovery that copolyester-carbonates, polyarylates, polyphenylene ethers, and polystyrenes are generally combinable over a wide range of proportions. This allows for custom formulation of compositions or blends having predetermined properties ranging between those of the components making up these blends. This is somewhat unusual since blending of two or more polymers generally results in compositions displaying distinct sets of properties, i.e., one for each of the resinous components.

Obviously other modifications and variations of the present invention are possible in light of the above teachings. It is, therefore, to be understood that changes and variations may be made in the particular embodiments of the invention described which are within the full intended scope of the invention as defined by the appended claims.

What is claimed is:

1. A resinous composition comprising, in physical admixture:
    (i) at least one copolyester-carbonate resin containing from about 25 to about 90 mole percent ester bonds;
    (ii) at least one polyarylate resin derived from at least one dihydric phenol and at least one aromatic dicarboxylic acid; and
    (iii) at least one polyphenylene ether resin, said polyphenylene ether containing at least one recurring structural unit represented by the formula

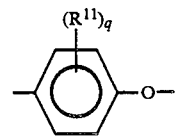

wherein $R^{11}$ is independently selected from monovalent substituents, and q is a positive integer having a value of from 0 to 4 inclusive.

2. The composition of claim 1 wherein said copolyester-carbonate resin is derived from at least one dihydric phenol, a carbonate precursor, and at least one ester precursor.

3. The composition of claim 2 wherein said ester precursor is selected from isophthaloyl dihalide, terephthaloyl dihalide, or mixtures thereof.

4. The composition of claim 3 wherein said carbonate precursor is phosgene.

5. The composition of claim 1 wherein said aromatic dicarboxylic acid or its ester forming reactive derivative is selected from isophthalic acid, terephthalic acid, or mixtures thereof.

6. The composition of claim 1 which contains from about 10 to about 80 weight percent of (i), from about 10 to about 80 weight percent of (ii), and from about 5 to about 70 weight percent of (iii).

7. The composition of claim 6 which contains from about 15 to about 65 weight percent of (i), from about 15 to about 65 weight percent of (ii), and from about 10 to about 60 weight percent of (iii).

8. The composition of claim 1 which contains from about 25 to about 40 weight percent of (i), from about 25 to about 40 weight percent of (ii), and from about 25 to about 40 weight percent of (iii).

9. The composition of claim 1, wherein said monovalent substituents represented by $R^{11}$ are selected from halogen, hydrocarbon radicals free of a tertiary alpha-carbon atom, halohydrocarbon radicals having at least two carbon atoms between the halogen atom and phenyl nucleus and being free of a tertiary alpha-carbon atom, hydrocarbonoxy radicals being free of a tertiary alpha-carbon atom, or halohydrocarbonoxy radicals having at least two carbon atoms between the halogen atom and phenyl nucleus and being free of a tertiary alpha-carbon atom.

10. The composition of claim 1 wherein said copolyester-carbonate resin has an ester content of about 75 mole percent.

11. The composition of claim 10 wherein said ester content is about 93 mole percent isophthalate and about 7 mole percent terephthalate.

12. The composition of claim 11 which contains about ⅓ weight percent (i), about ⅓ weight percent (ii), and about ⅓ weight percent (iii).

13. The composition of claim 1 which contains a flame retardant amount of at least one flame retardant compound.

14. The composition of claim 13 wherein said flame retardant compound is selected from the alkali or alkaline earth metal salts of organic sulfonic acids.

* * * * *

UNITED STATES PATENT AND TRADEMARK OFFICE
CERTIFICATE OF CORRECTION

PATENT NO. : 4,804,700

DATED : February 14, 1989

INVENTOR(S) : Deborah Lynn Allen

It is certified that error appears in the above-identified patent and that said Letters Patent is hereby corrected as shown below:

Col. 3, line 10
Delete "poitions" and add "positions"

Col. 3, line 56
Delete "difnctional" and add "difunctional"

Col. 3, line 61
Delete "aiphatic" and add "aliphatic"

Col. 9, line 59
Delete "polystrrene" and add "polystyrene"

Col. 12, line 18
Add "resin" between "ether" and "containing"

Signed and Sealed this

Twenty-seventh Day of November, 1990

*Attest:*

HARRY F. MANBECK, JR.

*Attesting Officer*     *Commissioner of Patents and Trademarks*